(12) United States Patent
Ott et al.

(10) Patent No.: US 8,997,781 B2
(45) Date of Patent: Apr. 7, 2015

(54) VACUUM PUMP

(75) Inventors: Hans-Peter Ott, Hirrlingen (DE); Willi Schneider, Bodelshausen (DE); Torsten Helle, Tübingen (DE)

(73) Assignee: Joma-Polytec GmbH, Bodelshausen (DE)

( * ) Notice: Subject to any disclaimer, the term of this patent is extended or adjusted under 35 U.S.C. 154(b) by 185 days.

(21) Appl. No.: 13/817,118

(22) PCT Filed: Aug. 16, 2011

(86) PCT No.: PCT/EP2011/064064
§ 371 (c)(1),
(2), (4) Date: Feb. 14, 2013

(87) PCT Pub. No.: WO2012/022732
PCT Pub. Date: Feb. 23, 2012

(65) Prior Publication Data
US 2013/0139912 A1    Jun. 6, 2013

(30) Foreign Application Priority Data

Aug. 16, 2010    (DE) .......................... 10 2010 039 343

(51) Int. Cl.
| | |
|---|---|
| F04C 29/12 | (2006.01) |
| F16K 15/14 | (2006.01) |
| F04C 18/344 | (2006.01) |
| F04C 25/02 | (2006.01) |
| F16K 27/02 | (2006.01) |

(52) U.S. Cl.
CPC ............. *F04C 29/126* (2013.01); *F04C 18/344* (2013.01); *F04C 25/02* (2013.01); *F16K 15/148* (2013.01); *F16K 27/0209* (2013.01)

(58) Field of Classification Search
USPC .............................................. 137/512.15, 854
See application file for complete search history.

(56) References Cited

U.S. PATENT DOCUMENTS

| | | | |
|---|---|---|---|
| 4,360,326 A | | 11/1982 | Buchholz et al. |
| 4,711,224 A | * | 12/1987 | Eckhardt ....................... 137/854 |
| 5,129,426 A | * | 7/1992 | Boehmer ....................... 137/854 |
| 5,996,631 A | * | 12/1999 | Thronton ....................... 137/854 |
| 6,354,810 B1 | | 3/2002 | Minami et al. |
| 8,776,831 B2 | * | 7/2014 | Otsuka et al. ............. 137/512.15 |

(Continued)

FOREIGN PATENT DOCUMENTS

| | | |
|---|---|---|
| CN | 1276493 | 12/2000 |
| DE | 21 19 613 | 11/1971 |

(Continued)

OTHER PUBLICATIONS

International Search Report issued by the European Patent Office in International Application No. PCT/EP2011/064064.

*Primary Examiner* — John Rivell
(74) *Attorney, Agent, or Firm* — Henry M. Feiereisen LLC

(57) ABSTRACT

The invention relates to a vacuum pump, in particular a vane pump, having a pump housing in which an intake chamber is provided, and a pump housing opening which feeds into the intake chamber, wherein an intake check valve is arranged in the pump housing opening and communicates with the atmosphere or feeds into an external vacuum chamber, with the intake check valve being accommodated in a pot-shaped valve housing, and with the pot-shaped valve housing having a housing bottom and a housing jacket, wherein the housing bottom is connectable to the housing jacket and the housing bottom can be snapped onto the housing jacket.

13 Claims, 3 Drawing Sheets

(56) References Cited

U.S. PATENT DOCUMENTS

2007/0095403 A1    5/2007    Su
2008/0178884 A1*    7/2008    Gerson et al. ................ 137/854

FOREIGN PATENT DOCUMENTS

| | | |
|---|---|---|
| DE | 29 04 686 | 8/1980 |
| DE | 31 05 665 | 3/1982 |
| DE | 36 18 301 | 12/1988 |
| DE | 44 39 880 | 5/1996 |
| DE | 101 47 325 | 5/2002 |
| DE | 102007026543 | 12/2008 |
| DE | 102008059227 | 5/2010 |
| DE | 102008059228 | 5/2010 |
| FR | 2 635 368 | 2/1990 |
| FR | 2 815 384 | 4/2002 |
| JP | 61-171894 | 8/1986 |
| WO | WO 92/20944 | 11/1992 |
| WO | WO 03/071135 | 8/2003 |
| WO | WO 2008/009251 | 1/2008 |
| WO | WO 2008/076962 | 6/2008 |
| WO | WO 2010/024044 | 3/2010 |

* cited by examiner

VACUUM PUMP

CROSS-REFERENCES TO RELATED APPLICATIONS

This application is the U.S. National Stage of International Application No. PCT/EP2011/064064, filed Aug. 16, 2011, which designated the United States and has been published as International Publication No. WO 2012/022732 A2 and which claims the priority of German Patent Application, Serial No. 10 2010 039 343.6, filed Aug. 16, 2010, pursuant to 35 U.S.C. 119(a)-(d).

BACKGROUND OF THE INVENTION

The invention relates to a vacuum pump, in particular a vane pump, having a pump housing in which an intake chamber is provided, and a pump housing opening which feeds into the intake chamber, wherein an intake check valve is arranged in the pump housing opening and communicates with the atmosphere or feeds into an external vacuum chamber, with the intake check valve being accommodated in a pot-shaped valve housing, and with the pot-shaped valve housing having a housing bottom and a housing jacket.

WO 2008/009 251 A1 discloses a vacuum pump having such a structure. This vacuum pump draws air from a vacuum chamber, for example a brake booster, with the intake chamber being formed within the vacuum pump by vanes. To prevent a return flow, the vacuum pump is equipped with an intake check valve which is arranged in a pump housing opening. This intake check valve has a sleeve-like configuration and has a pot-shaped valve housing with a housing jacket and a housing bottom, with the housing bottom being inserted into the pump housing of the vacuum pump. A vacuum hose for example is placed upon the free end of the intake check valve which protrudes from the pump housing of the vacuum pump. The intake check valve is sealed in the pump housing opening for example by sealing elements, for example O-rings. In the afore-mentioned known vacuum pump, a support body is inserted into the housing jacket of the intake check valve for holding the valve body.

SUMMARY OF THE INVENTION

The invention is based on the object to provide a vacuum pump, in particular an intake check valve, that is easy to manufacture and can be easily serviced.

This object is attained in accordance with the invention for a vacuum pump of the above mentioned type in that the housing bottom is connectable to the housing jacket.

The invention thus relates to a vacuum pump or an intake check valve, in which the housing bottom is formed as a separate component, in particular as a support body for the valve body. During assembly, the housing bottom is equipped with the appropriate valve body and connected to the housing jacket.

In order to facilitate repair or inspection, the housing bottom is detachably connected to the housing jacket. Both assembly and disassembly is considerably simplified when the housing bottom is snapped onto the housing jacket. Thus, an automated assembly becomes possible.

In order to be able to secure the housing bottom in a simple manner, the housing jacket has a flange at its free end which receives the housing bottom. This flange is formed in one piece onto the housing jacket and is thus able to absorb great forces.

In order to be able to fix the housing bottom upon the housing jacket in any rotational position, the flange is formed to extend all-round. Thus, there is no need for a particular orientation of the housing bottom into a predetermined rotational position.

A simple and easy to execute clipping, also in an automated manner, through pressing of the housing bottom onto the housing jacket is realized according to the invention by providing the housing bottom on its end facing the housing jacket with at least two fingers which are connected to the flange. Preferably, the fingers are evenly spaced about the circumference on the housing bottom. An optimum restraint is realized by having the fingers engage behind the flange.

According to a preferred exemplary embodiment, the fingers protrude from the housing bottom in parallel relation to the longitudinal axis of the intake check valve and have a portion which extends radially away from the center of the housing bottom. In this way, the fingers yield elastically in both radial and axial directions.

According to a further refinement, the fingers have radially inwardly projecting latching hooks. This latch hook engages behind the flange and bears upon the latter under tension.

BRIEF DESCRIPTION OF THE DRAWING

Further advantages, features and details of the invention become apparent from the sub-claims and the following description which describes in detail a particularly preferred exemplary embodiment with reference to the drawing. The features shown in the drawing and set forth in the description and the claims can be essential to the invention by themselves or in any combination.

It is shown in the drawings in.

DETAILED DESCRIPTION OF PREFERRED EMBODIMENTS

Figure 1:
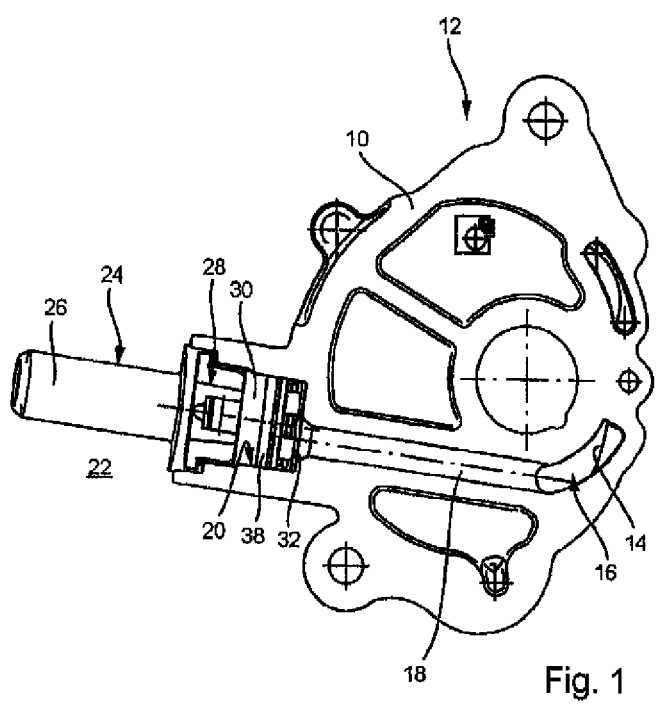
FIG. 1 a side view of an intake check valve which is inserted in a cursorily shown housing of a vacuum pump.
Figure 2:
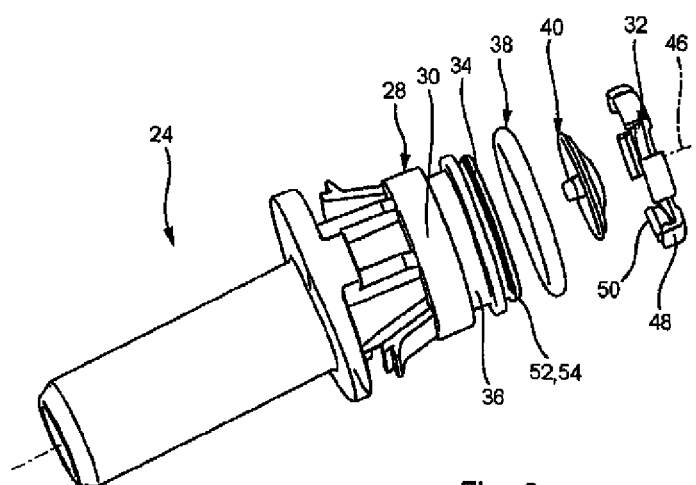
FIG. 2 an enlarged exploded view of the intake check valve according to FIG. 1.

FIG. 1 cursorily shows a pump housing, generally designated by 10, of a vacuum pump 12, with 14 designating the inner peripheral surface of an intake chamber 16. A channel 18 of a pump housing opening 20 feeds into this intake chamber 16 and communicates with the atmosphere 22. An intake check valve 24 is inserted in this pump housing opening 20 and has a free end 26 upon which a (not shown) vacuum hose can be slipped over. The intake check valve 24 has a valve housing 28 of pot-shaped configuration and is substantially formed by a housing jacket 30 and a housing bottom 32. The housing jacket 30 has a free end 34 in facing relationship to the housing bottom 32 for securement of the housing bottom 32. The intake check valve 24 is provided with a circumferential groove 36 for receiving a sealing ring 38, in particular an O-ring. FIG. 2 further shows an elastic valve body 40 which is arranged between the housing jacket 30 and the housing bottom 32 and is held by the housing jacket 30.

Figure 3:
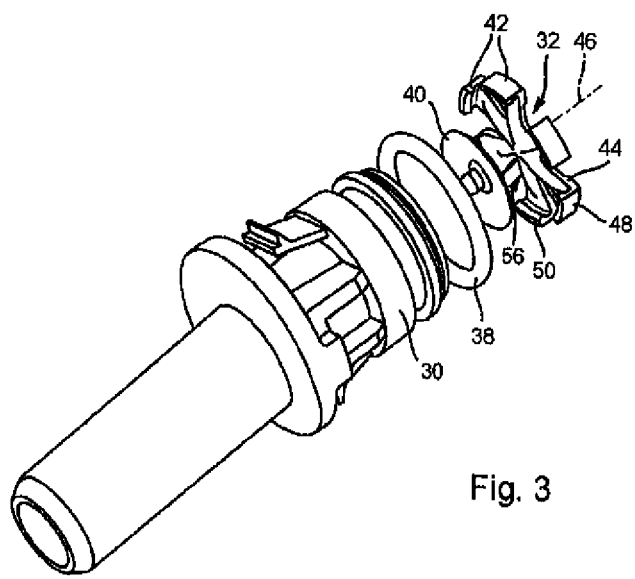
FIG. 3 a further exploded view of the intake check valve according to FIG. 1.

FIG. 3 shows in particular the configuration of the housing bottom 32 which has a total of six fingers 42 arranged radially around the center of the housing bottom 32. The fingers 42 have hereby a radially extending first portion 44 and a second portion 48 which extends parallel to the longitudinal axis 46 of the intake check valve 24 and ends in latching hooks 50. When the intake check valve 24 is installed, these latching hooks 50 engage behind a radially protruding shoulder 52 of a flange 54 which is formed by the free end 34. This shoulder 52 wraps around completely so that the housing bottom 32 can be snapped on in any rotational position. The openings 56 between the fingers 42 provide a passage for the fluid which does not undergo any change in direction, i.e. is able to flow through the housing bottom 32 in the direction of the longitudinal axis 46.

What is claimed is:

1. A vacuum pump, comprising:
   a pump housing having an intake chamber;
   an intake check valve arranged in a pump housing opening which feeds into the intake chamber, said intake check valve having a pot-shaped valve housing formed by a housing bottom and a housing jacket which is connectable to the housing bottom and has a free end provided with a flange and configured to receive the housing bottom; and
   a snap-on connection to connect the housing bottom onto the housing jacket,
   wherein the housing bottom has an end in facing relationship to the housing jacket, said end of the housing bottom having at least two fingers which engage behind the flange to realize the snap-on connection.

2. The vacuum pump of claim 1, constructed in the form of a vane pump.

3. The vacuum pump of claim 1, wherein the pump housing opening communicates with the atmosphere or feeds into an external vacuum chamber.

4. The vacuum pump of claim 1, wherein the snap-on connection for connecting the housing bottom to the housing jacket is detachable.

5. The vacuum pump of claim 1, wherein the flange is configured to extend all-round.

6. The vacuum pump of claim 1, wherein the fingers engage behind the flange.

7. The vacuum pump of claim 1, wherein the fingers protrude from the housing bottom and extend in parallel relation to a longitudinal axis of the intake check valve.

8. The vacuum pump of claim 1, wherein the fingers have radially inwardly projecting latching hooks.

9. The vacuum pump of claim 1, wherein the fingers have a first portion which extends radially away from a center of the housing bottom, and a second portion which extends parallel to a longitudinal axis of the intake check valve.

10. The vacuum pump of claim 1, wherein the fingers define there between an opening to provide a passage for the fluid in a direction of a longitudinal axis of the intake check valve.

11. The vacuum pump of claim 1, wherein the fingers are configured to yield elastically in both radial and axial directions.

12. The vacuum pump of claim 1, wherein the fingers are evenly spaced about a circumference on the housing bottom.

13. The vacuum pump of claim 8, wherein the latching hooks of the fingers engage behind a radially protruding shoulder of the flange.

* * * * *